UNITED STATES PATENT OFFICE.

MARY G. HOLDER, OF NEW YORK, N. Y.

OINTMENT.

SPECIFICATION forming part of Letters Patent No. 272,138, dated February 13, 1883.

Application filed November 20, 1882. (No specimens.)

*To all whom it may concern:*

Be it known that I, MARY G. HOLDER, a citizen of the United States, residing at the city of New York, in the county and State of New York, have invented a new and useful composition or medical compound, the same being a salve or ointment for the cure of cuts, bruises, scalds, burns, abrasions of the skin and such like injuries, and for the alleviation and cure of hemorrhoids, which invention is fully set forth in the following specification.

The compound of salve consists of the following-named ingredients, combined in the manner and proportions below stated, namely: Common May-weed, or *Anthemis cotula*, stalk and blossoms, one-fourth of a pound; beef-tallow, (best quality,) one and one-half pound; hog's lard, (best quality,) one pound; carbolic acid, (pure,) one-fourth of a dram.

The method of making the salve from the above-named ingredients is as follows: The stalk and blossoms of the May-weed are first boiled in about three quarts of water, making preferably a decoction, rather than an infusion, the boiling being continued until the water is evaporated to about half the original quantity. The tallow and the lard are next melted, preferably in separate vessels, and then, after straining the decoction, they are mixed therewith in equal quantities, by measure, in one vessel. This mixture is now allowed to simmer over a slow fire until the water is all expelled by evaporation, when it is strained through a suitable seive or cloth, after which the carbolic acid is added. All of these ingredients having been well stirred together, the completed mixture is allowed to cool and harden.

I do not confine myself to the exact proportions above given, as they may be varied somewhat without materially changing the value of the compound. Instead of beef-tallow and lard, any suitable fatty or oleaginous substance or substances may be used. Such ingredients manifestly are mainly emollient vehicles for the others, and the lard prevents the tallow from making the compound too hard and stiff when cold.

This salve may be bleached and its appearance and consistency improved if it be beaten or whipped up before being boxed or put up in suitable vessels for use. The best consistence for the salve at ordinary temperatures is about that of so-called "cold cream."

This salve may be applied to the injured or diseased parts either spread upon linen or cotton cloth, or by simple anointment, or in any efficacious or well-known manner of applying ointments and salves.

Having thus fully explained and disclosed the method of compounding and using this medical compound or salve, as of my invention, I claim—

The above-described medical compound or salve, consisting of May-weed, or *Anthemis cotula*, tallow, lard, and carbolic acid, all combined substantially in the manner and proportions described, for the purposes set forth.

MARY G. HOLDER.

Witnesses:
GEO. F. VAIL,
W. P. BOLLES.